(12) United States Patent
Huang et al.

(10) Patent No.: US 11,411,729 B2
(45) Date of Patent: Aug. 9, 2022

(54) RECEIVING CIRCUIT AND SIGNAL PROCESSING METHOD FOR HIGH DEFINITION MULTIMEDIA INTERFACE

(71) Applicant: Realtek Semiconductor Corp., HsinChu (TW)

(72) Inventors: Kuan-Chia Huang, New Taipei (TW); Tsung-Hsuan Wu, Hsinchu County (TW); Ching-Sheng Cheng, Nantou County (TW)

(73) Assignee: Realtek Semiconductor Corp., HsinChu (TW)

( * ) Notice: Subject to any disclaimer, the term of this patent is extended or adjusted under 35 U.S.C. 154(b) by 236 days.

(21) Appl. No.: 16/805,815

(22) Filed: Mar. 1, 2020

(65) Prior Publication Data

US 2020/0313883 A1 Oct. 1, 2020

(30) Foreign Application Priority Data

Mar. 26, 2019 (TW) ................................. 108110366

(51) Int. Cl.
*G06F 3/14* (2006.01)
*H04L 9/12* (2006.01)

(52) U.S. Cl.
CPC . *H04L 9/12* (2013.01); *G06F 3/14* (2013.01)

(58) Field of Classification Search
CPC ......... H04L 9/12; G06F 3/14; H04N 1/00095; H04N 7/52; H04N 9/00
See application file for complete search history.

(56) References Cited

U.S. PATENT DOCUMENTS

| | | | |
|---|---|---|---|
| 7,295,578 B1 * | 11/2007 | Lyle | G06F 3/14 348/473 |
| 7,565,530 B2 | 7/2009 | Kwak | |
| 7,706,691 B2 * | 4/2010 | Lin | G09G 5/006 398/110 |

(Continued)

FOREIGN PATENT DOCUMENTS

| | | |
|---|---|---|
| CN | 1681318 A | 10/2005 |
| CN | 102385567 B | 6/2014 |
| WO | 2011/084340 A1 | 7/2011 |

OTHER PUBLICATIONS

Wu, the specification, including the claims, and drawings in the U.S. Appl. No. 16/808,403, filed Mar. 4, 2020.

*Primary Examiner* — Hosuk Song
(74) *Attorney, Agent, or Firm* — Winston Hsu

(57) ABSTRACT

A receiving circuit includes a first channel, a second channel, a third channel and a control circuit, wherein the first channel is arranged to decode and descramble a first data stream to generate first data corresponding to first color information of an image frame, the second channel is arranged to decode and descramble a second data stream to generate second data corresponding to second color information of the image frame, and the third channel is arranged to decode and descramble a third data stream to generate third data corresponding to third color information of the image frame. The control circuit is configured to enable the first channel to make the first channel decode the first data stream, and enable or disable at least part of functions of the second channel and the third channel according to whether or not the image frame is displayed on a display panel.

20 Claims, 5 Drawing Sheets

(56) References Cited

U.S. PATENT DOCUMENTS

| | | | | |
|---|---|---|---|---|
| 8,237,625 | B2 * | 8/2012 | Madonna | G06F 3/038 |
| | | | | 345/2.1 |
| 8,730,400 | B2 * | 5/2014 | Kim | G06F 3/1431 |
| | | | | 348/706 |
| 9,264,765 | B2 * | 2/2016 | Sasaki | H04N 21/2343 |
| 9,288,430 | B2 * | 3/2016 | Ogawa | H04N 9/8042 |
| 9,357,192 | B2 * | 5/2016 | Minemura | H04N 1/00095 |
| 10,880,351 | B1 * | 12/2020 | Estus | H04L 65/602 |
| 2005/0228995 | A1 | 10/2005 | Kwak | |
| 2009/0296938 | A1 | 12/2009 | Devanand | |
| 2011/0134330 | A1 | 6/2011 | Yu | |
| 2012/0027203 | A1 | 2/2012 | Inada | |
| 2012/0054517 | A1 | 3/2012 | Fuh | |
| 2012/0140924 | A1 | 6/2012 | Murakami | |
| 2013/0301648 | A1 * | 11/2013 | Yamashita | H04N 7/015 |
| | | | | 370/431 |

\* cited by examiner

RECEIVING CIRCUIT AND SIGNAL PROCESSING METHOD FOR HIGH DEFINITION MULTIMEDIA INTERFACE

BACKGROUND OF THE INVENTION

1. Field of the Invention

The present invention relates to a High Definition Multimedia Interface (HDMI), and more particularly, to a receiving circuit that conforms the HDMI and a High-Bandwidth Digital Content Protection (HDCP) specification.

2. Description of the Prior Art

In the HDMI and HDCP specifications, when the display device is connected to multiple signal sources by using the HDMI connector and the user switches from one signal source to another signal source, it may take several seconds to display the images of the other signal source, causing inconvenience to the user. Therefore, in order to make the display device quickly display the images when the user switches the signal source, each HDMI port needs to be continuously connected to the corresponding signal source and maintain HDCP authentication. However, maintaining HDCP authentication will greatly increase the power consumption.

SUMMARY OF THE INVENTION

It is therefore an objective of the present invention to provide a receiving circuit applied to HDMI and associated signal processing method, which can greatly reduce the power consumption of the display device while maintaining the HDCP authentication to avoid the display waiting time, to solve the above-mentioned problems.

In one embodiment of the present invention, a receiving circuit applied to an HDMI is disclosed. The receiving circuit includes a first channel, a second channel, a third channel and a control circuit, wherein the first channel is arranged to decode and descramble a first data stream to generate first data corresponding to first color information of an image frame, the second channel is arranged to decode and descramble a second data stream to generate second data corresponding to second color information of the image frame, and the third channel is arranged to decode and descramble a third data stream to generate third data corresponding to third color information of the image frame. In the operations of the receiving circuit, the control circuit is configured to enable or disable at least part of functions of the first channel, the second channel and the third channel according to whether or not the image frame is displayed on a display panel.

In another embodiment of the present invention, a signal processing method applied to an HDMI is disclosed, wherein the signal processing method includes the steps of: providing a first channel to decode and descramble a first data stream to generate first data corresponding to first color information of an image frame; providing a second channel to decode and descramble a second data stream to generate second data corresponding to second color information of the image frame; providing a third channel to decode and descramble a third data stream to generate third data corresponding to third color information of the image frame; and determining to enable or disable at least part of functions of the first channel, the second channel and the third channel according to whether or not the image frame is displayed on a display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
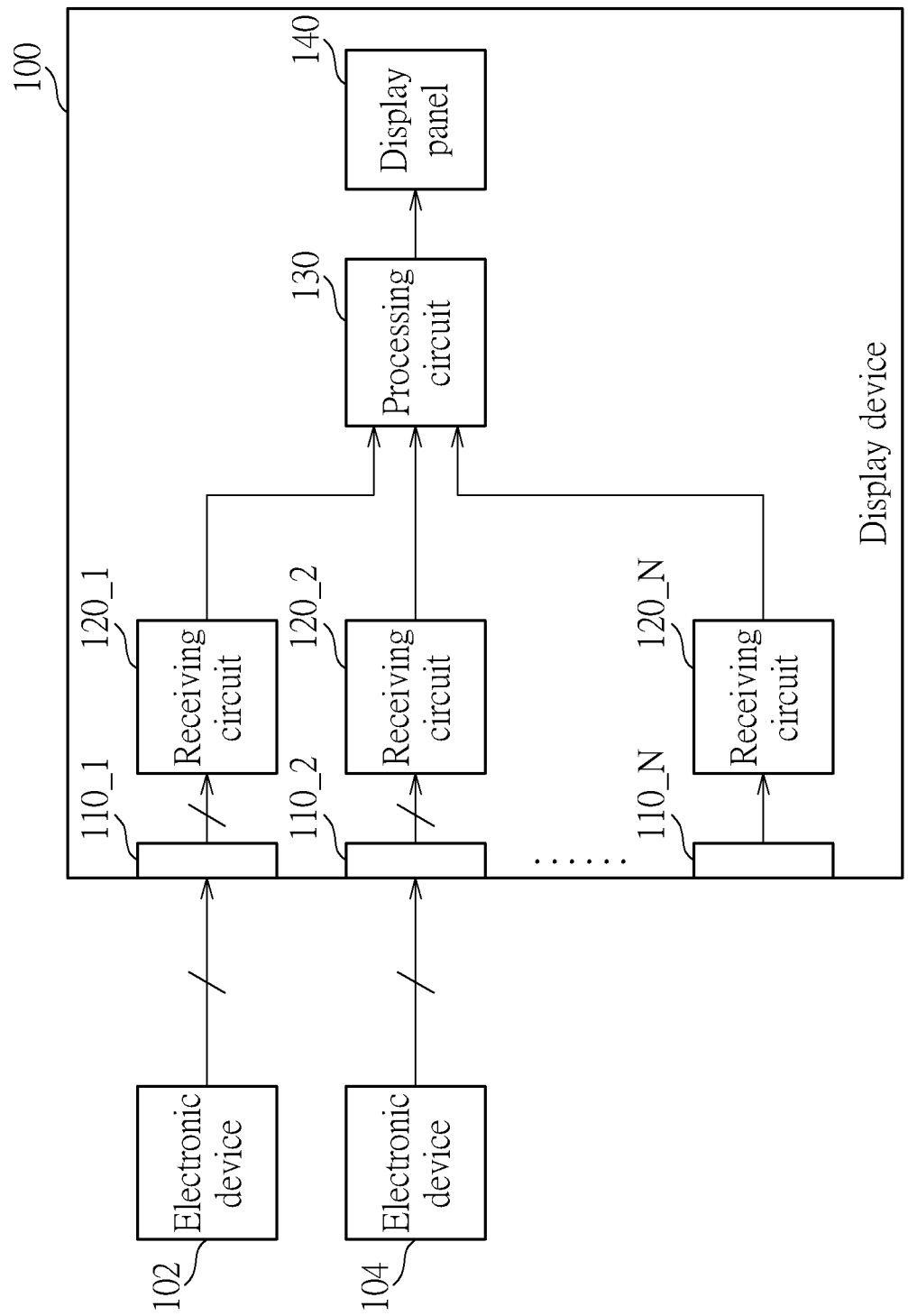
FIG. 1 is a diagram illustrating a display device according to one embodiment of the present invention.

FIG. 1 is a diagram illustrating a display device 100 according to one embodiment of the present invention. As shown in FIG. 1, the display device 100 includes a plurality of HDMI connectors 110_1-110_N, a plurality of receiving circuits 120_1-120_N, a processing circuit 130 and a display panel 140. In this embodiment, the HDMI connectors 110_1-110_N of the display device 100 are used to connect to a plurality of signal sources such as electronic devices 102 and 104, and the display device 100 receives image data from the electronic devices 102 and 104 to be displayed thereon. In this embodiment, the image data received by the display device 100 complies with the HDCP specification, that is, the key authentication is required for displaying the image data.

In the embodiment shown in FIG. 1, the display device 100 can simultaneously connect to a plurality of signal sources such as the electronic devices 102 and 104, and the user can control the display device 100 to select and display the image data of one of the electronic devices. For example, when the user selects the image data of the electronic device 102, the receiving circuit 120_1 receives the image data of the electronic device 102 via the HDMI connector 110_1, and after the decoding operation, descrambling operation and the key authentication, the image data is transmitted to the processing circuit 130 for subsequent processing and then displayed on the display panel 140. In addition, in order to make the display device 100 quickly display the image data from the electronic device 104 when the user switches the signal source, the receiving circuit 120_2 continuously receives the image data from the electronic device 104 and performs the decoding operation, the descrambling operation and the key authentication, even if the image data of the electronic device 104 is not currently displayed on the display panel 140.

As described above, since the display device 100 performs the decoding operation, the descrambling operation and the key authentication for all of the received image signals, the receiving circuits 120_1-120_N have large power consumption. Therefore, the present embodiment provides a method for reducing the power consumption of the receiving circuits 120_1-120_N.

Figure 2:
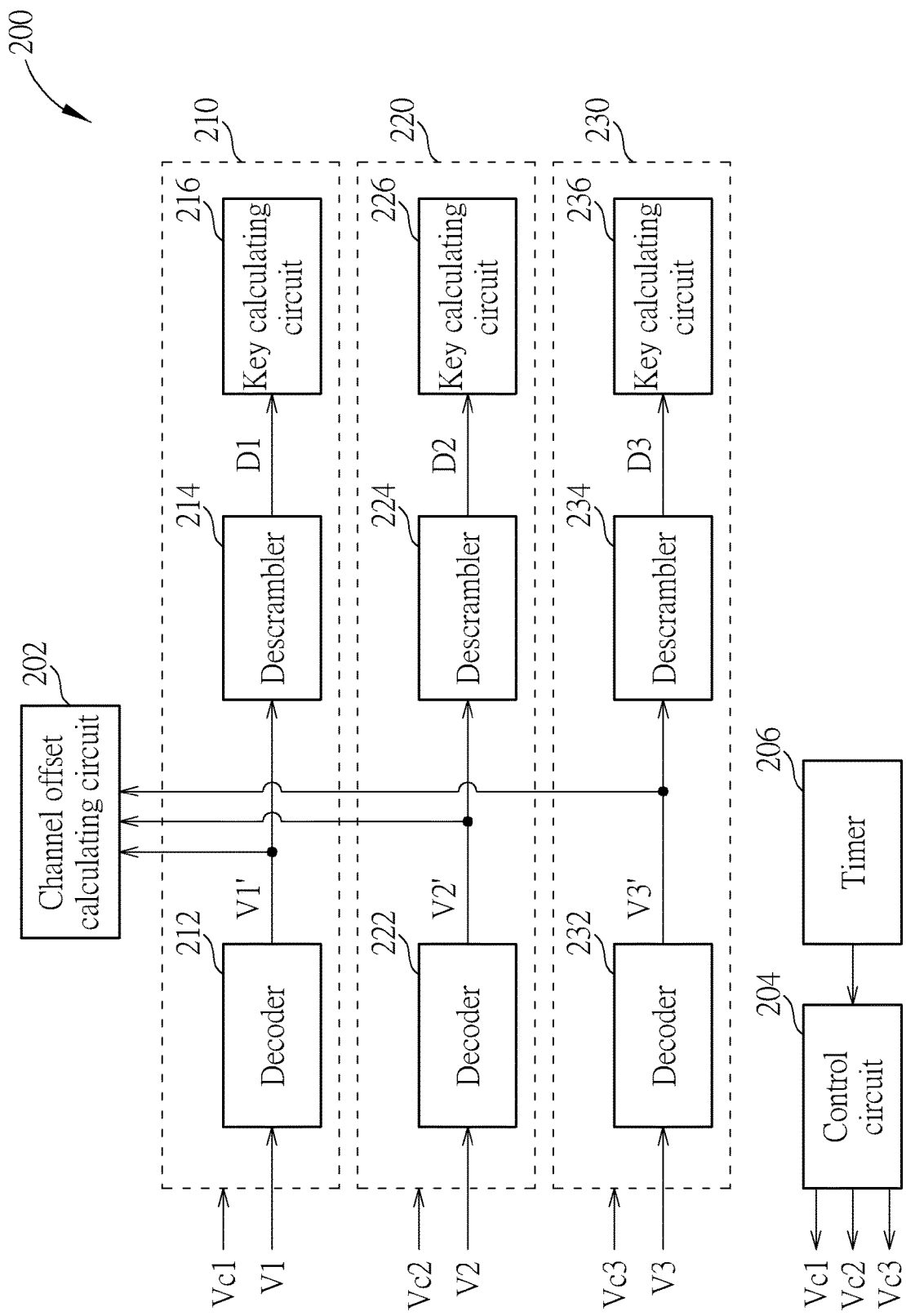
FIG. 2 is a diagram illustrating a receiving circuit according to one embodiment of the present invention.

FIG. 2 shows a receiving circuit 200 according to one embodiment of the present invention, where the receiving circuit 200 may be any one of the receiving circuits 120_1-120_N shown in FIG. 1. In FIG. 2, the receiving circuit 200 includes a first channel 210, a second channel 220, a third channel 230, a channel offset calculating circuit 202, a control circuit 204 and a timer 206, where the first channel 210 includes a decoder 212, a descrambler 214 and a key calculating circuit 216, the second channel 220 includes a decoder 222, a descrambler 224 and a key calculating circuit 226, and the third channel 230 includes a decoder 232, a descrambler 234 and a key calculating circuit 236.

In the present embodiment, the receiving circuit 200 has different operations according to whether or not the received image data is displayed on the display panel 140. Specifically, when image data received by the receiving circuit 200 will be displayed on the display panel 140, the control circuit 204 generates control signals Vc1, Vc2 and Vc3 to enable the first channel 210, the second channel 220 and the third channel 230. At this time, the decoder 212 within the first channel 210 decodes a first data stream V1 to generate decoded data V1', and the descrambler 214 performs a descrambling operation on the decoded data V1' to generate first data D1 corresponding to first color information of an image frame, and the key calculating circuit 216 calculates a frame key and line keys according to the first data D1 for key authentication. Similarly, the decoder 222 within the second channel 220 decodes a second data stream V2 to generate decoded data V2', and the descrambler 224 performs the descrambling operation on the decoded data V2' to generate second data D2 corresponding to second color information of the image frame, and the key calculating circuit 226 calculates a frame key and line keys according to the second data D2 for key authentication; and the decoder 232 within the third channel 230 decodes a third data stream V3 to generate decoded data V3', and the descrambler 234 performs the descrambling operation on the decoded data V3' to generate third data D3 corresponding to third color information of the image frame, and the key calculating circuit 236 calculates a frame key and line keys according to the third data D3 for key authentication. In this embodiment, the first color information of the image frame corresponding to the first channel 210 may be any one of red, green and blue, and the second color information of the image frame corresponding to the second channel 220 may be another one of red, green and blue, and the third color information of the image frame corresponding to the third channel 230 may be yet another one of red, green and blue. It should be noted that since the calculation of the frame key and the line keys and the authentication method can refer to the relevant specifications of the HDCP protocol, and the present invention does not focus on the calculation of the frame key and the line keys and the authentication method, the details are not described here. It should be understood that the color information corresponding to the image frame of the above channels are color components such as red, green and blue, however, the color information may also be Y, U and V information in the YUV color model, or Y, Cb and Cr information in the YCbCr color model. In an embodiment of the present invention, the first color information of the image frame corresponding to the first channel 210 may be any one of Y, U and V, the second color information of the image frame corresponding to the second channel 220 may be another one of Y, U and V, and the third color information of the image frame corresponding to the third channel 230 may be yet another one of Y, U and V. In another embodiment of the present invention, the first color information, the second color information and the third color information respectively corresponding to the first channel 210, the second channel 220 and the third channel may be Y, Cb and Cr information of the YCbCr color model.

In addition, when the image data received by the receiving circuit will not be displayed on the display panel 140, in order to reduce the power consumption of the receiving circuit 200, the control circuit 204 continuously enables one of the first channel 210, the second channel 220 and the third channel 230, and the remaining two channels are selectively enabled or disabled for power saving. To facilitate the subsequent description, the control circuit 204 continuously enables the first channel 210 in the following embodiments. In detail, the control circuit 204 generates the control signal Vc1 to enable the first channel 210, that is the decoder 212 decodes the first data stream V1 to generate the decoded data V1', and the descrambler 214 performs the descrambling operation on the decoded data V1' to generate the first data D1 corresponding to the first color information of the image frame, and the key calculating circuit 216 calculates the frame key and the line keys according to the first data D1 for key authentication. It should be noted that in the HDMI 2.0 specification, since the first data stream V1 from the transmitter is scrambled by a scrambler, and the first data stream V1 contains a plurality of unscrambled control bits for calculating descramble align information for the descrambler 214 to perform the descramble offset calculation (i.e., when to use a seed of the descrambler 214 to start the descrambling operation), and the occurrence time points of the control bits are not fixed, by continuously enabling the decoder 212 and the descrambler 214, it can ensure that the first channel 210 can receive the plurality of unscrambled control bits for the descrambling operation.

Figure 3:
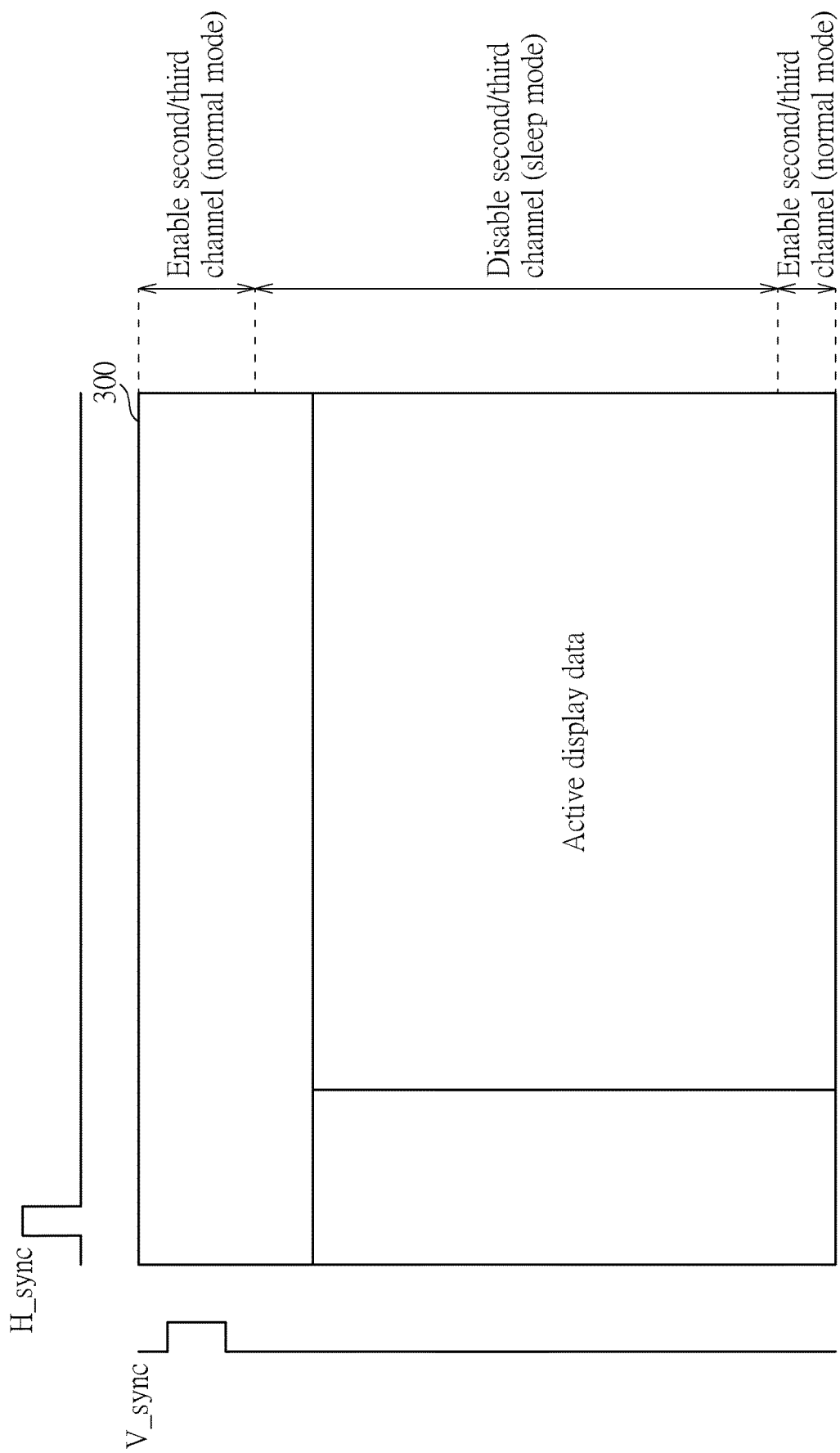
FIG. 3 is a diagram illustrating that the second channel and/or the third channel operate in a normal mode and a sleep mode.

Regarding the second channel 220 and the third channel 230, the control circuit 204 can determine the time points of enabling/disabling the second channel 220 and/or the third channel 230 according to the time information provided by the timer 206. Specifically, the control circuit 204 can refer to the time information provided by the timer 206 to enable the second channel 220 and/or the third channel 230 before the vertical synchronization signal V_sync of the next image frame appears (i.e. the normal mode). For example, the control circuit 204 can enable the second channel 220 and/or the third channel 230 when the decoder 212 outputs the last few rows of the active display data of an image frame 300 for the channel offset calculating circuit 202 to calculate channel offset information between the first channel 210, the second channel 220 and the third channel 230 (e.g., how many clock cycles between the pixels at the same position for any two of the channels). For example, the channel offset calculating circuit 202 can calculate the channel offset information between the channel 210, the second channel 220 and the third channel 230 according to the difference between the start time points (i.e. time of the rising edge) of the vertical synchronization signals V_sync in the decoded signals V1', V2' and V3' output by the decoders 212, 222 and 232, respectively. In addition, the control circuit 204 disables the second channel 220 and/or the third channel 230 for a period of time after the vertical synchronization signal V_sync appears, that is, the control circuit 204 disables at least a part of the components of the second channel 220 and/or the third channel 230 to enter a sleep mode. In addition, FIG. 3 shows the image frame and related horizontal synchronization signal H_sync and vertical synchronization signal V_sync. In FIG. 3, the active display data of the image frame 300 is the content actually displayed on the display panel 140, and the remaining areas are the vertical blanking interval and the horizontal blanking interval, wherein the second channel 220 and/or the third channel 230 enter the normal mode at the last few rows of the active display data, in preparation for the calculation of the channel offset information between the first channel 210, the second channel 220 and the third channel 230, and then the second channel 220 and/or the third channel 230 enter the sleep mode (generally before the active display data). Because the contents of the image frame 300 are well known to those skilled in the art, the details are not described here.

After the channel offset calculating circuit 202 determines the channel offset information, the descrambler 224 in the second channel 220 and/or the descrambler 234 in the second channel 230 may perform the descrambling operations to generate the second data D2 and/or the third data D3 according to the descramble align information generated by the first channel 210 and the channel offset information generated by the channel offset calculating circuit 202. As used in this disclosure, "A and/or B" and "at least one of A and B" mean any combination of one or more of the listed related items (A, B) (for example, A, B or combination of A and B).

Figure 4:
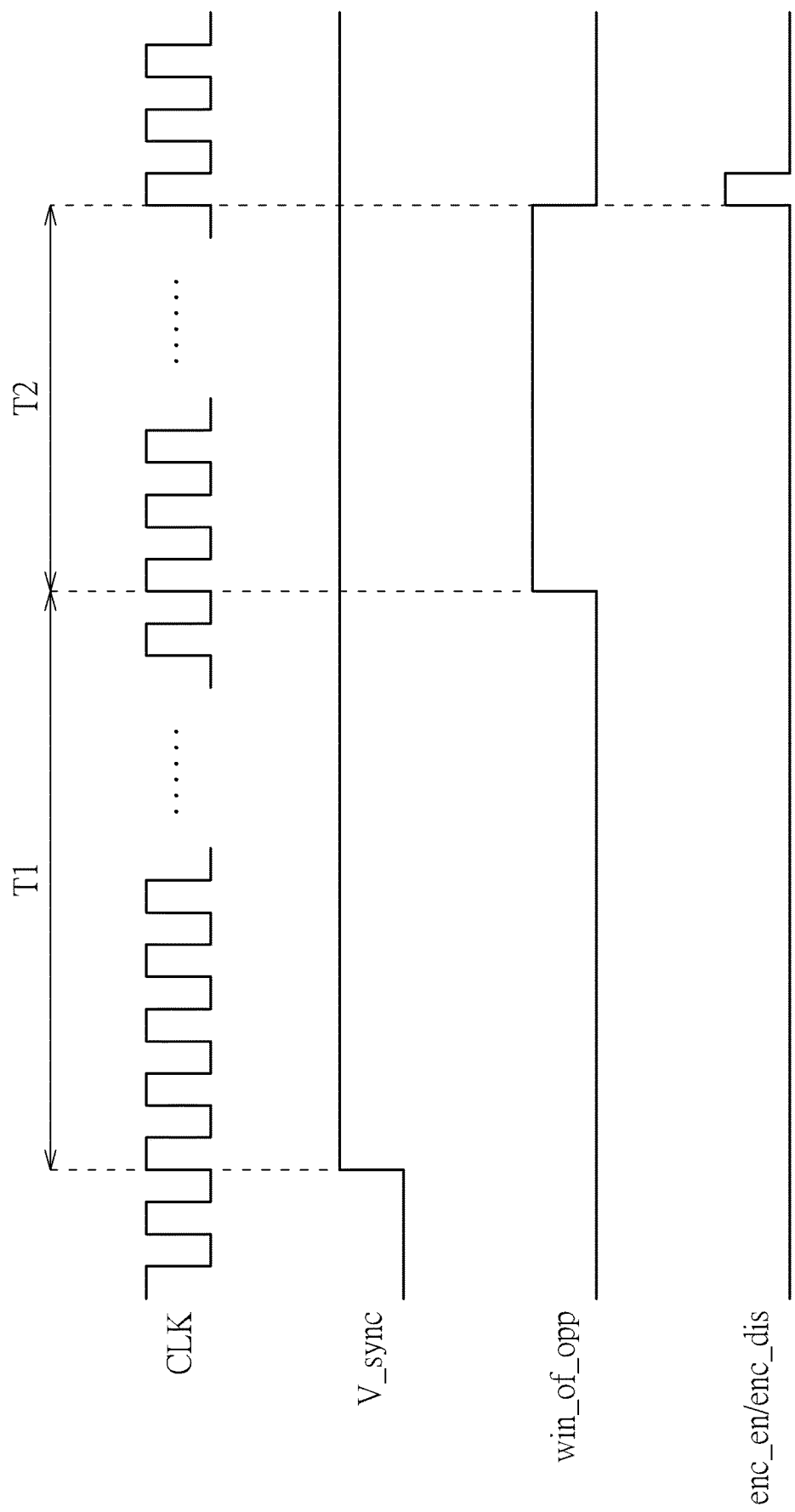
FIG. 4 is a timing diagram of a clock signal, a vertical synchronization signal and an encryption status signal.

FIG. 4 is a timing diagram of a clock signal CLK, the vertical synchronization signal V_sync, a signal win_of_opp and an encryption status signal enc_en/enc_dis. Taking the first channel 210 as an example, when the key calculating circuit 216 detects a period of time T1 after the vertical synchronization signal V_sync is enabled and the signal win_of_opp is enabled, the key calculating circuit 216 starts to determine the encryption status signal enc_en/enc_dis according to the data within a period T2. In one embodiment, the encryption status signal enc_en/enc_dis can be determined according to a plurality of control bits of the signal from the electronic device 102/104 during the period T2. The encryption status signal enc_en/enc_dis is used to indicate if using the received data within the period T1 and the frame key of a previous image frame to calculate the frame key of the image frame 300. In detail, if the encryption status signal enc_en is determined according to the data within the period T2, the key calculating circuit 216 can calculate a new frame key; and if the encryption status signal enc_dis is determined according to the data within the period T2, the key calculating circuit 216 uses the frame key of the previous image frame to serve as the frame key of the image frame 300. In one embodiment, the encryption status signal enc_en/enc_dis is determined within the period T2. In one embodiment, the period T1 can be 0-511$^{th}$ cycles of the clock signal CLK after the vertical synchronization signal V_sync is enabled, the period T2 can be 512$^{th}$-527$^{th}$ cycles of the clock signal CLK, and the key calculating circuit 216 can calculate the frame key within a period of time (e.g. (48+56) cycles of the clock signal CLK) after determining the encryption status signal enc_en/enc_dis. Regarding the calculation of the frame key, in the HDCP 1.4 specification, the key calculating circuit 216 refers to the received data within the period T1 and the frame key of the previous image frame to calculate the frame key of the image frame 300; and in the HDCP 2.2 specification, the key calculating circuit 216 only needs to record counting values of the image frames.

As described above, when the image data received by the receiving circuit 220 is not displayed on the display panel 140, at least part of the functions of the second channel 220 and/or the third channel 230 is dynamically disabled to reduce the power consumption. In one embodiment, the above-mentioned part of the functions are the decoding operation, the descrambling operation and the key calculation, but it's not a limitation of the present invention. In addition, because the receiving circuit 200 still calculates the frame key of each image frame, the display device 100 can effectively reduce the power consumption while maintaining the connection between the display device 100 and the electronic devices 102, 104.

In a portion of specifications of HDMI, the above-mentioned encryption status signal enc_en/enc_dis is generated by using four control bits CTL0-CTL3, wherein the first control bit CTL2 and the second control bit CTL3 are included in the red channel, and the third control bit CTL0 and the fourth control bit CTL1 are included in the green channel. When the control bits CTL0, CTL1, CTL2, and CTL3 are respectively "1, 0, 0, 1", the encryption status signal is enc_en; and when the control bits CTL0, CTL1, CTL2, CTL3 are respectively "1, 0, 0, 0", the encryption status signal is enc_dis. Therefore, since the encryption status signal enc_en/enc_dis only needs the information of the red channel and the green channel, if the first channel 210 corresponds to the red component of the image frame, the control circuit 204 can only dynamically enable and disable the channel (e.g. the second channel 220) corresponding to the green component of the image frame to successfully obtain the encryption status signal enc_en/enc_dis, and at this time, the channel (e.g. the third channel 230) corresponding to the blue component of the image frame can be always disabled (i.e. the internal components always sleep). In addition, if the first channel 210 corresponds to the green component of the image frame, the control circuit 204 can only dynamically enable and disable the channel (e.g. the second channel 220) corresponding to the red component of the image frame to successfully obtain the encryption status signal enc_en/enc_dis, and at this time, the channel (e.g. the third channel 230) corresponding to the blue component of the image frame can be always disabled to lower the power consumption. In addition, if the first channel 210 corresponds to the blue component of the image frame, the control circuit 204 must dynamically enable and disable the second channel 220 and the third channel 230 to obtain the encryption status signal enc_en/enc_dis according to the second data D2 and the third data D3.

In another embodiment, because the first control bit CTL2 and the second control bit CTL3 are included in the red channel, the third control bit CTL0 and the fourth control bit CTL1 are included in the green channel, the encryption status signal is enc_en when the control bits CTL0, CTL1, CTL2, and CTL3 are respectively "1, 0, 0, 1", and the encryption status signal is enc_dis when the control bits CTL0, CTL1, CTL2, CTL3 are respectively "1, 0, 0, 0", the related circuit only needs the first control bit CTL2 and the second control bit CTL3 to determine the encryption status signal enc_en/enc_dis, without using four control bits CTL0-CTL3. In light of above, if the first channel 210 corresponds to the red component of the image frame, the control circuit 204 can directly disable the second channel 220 and the third channel 230 (i.e. the internal components always sleep). In addition, if the first channel 210 corresponds to the green component of the image frame, the control circuit 204 can only dynamically enable and disable the channel (e.g. the second channel 220) corresponding to the red component of the image frame to successfully obtain the encryption status signal enc_en/enc_dis, and at this time, the channel (e.g. the third channel 230) corresponding to the blue component of the image frame can be always disabled to lower the power consumption. In addition, if the first channel 210 corresponds to the blue component of the image frame, the control circuit 204 can only dynamically enable and disable the channel (e.g. the second channel 220) corresponding to the red component of the image frame to successfully obtain the encryption status signal enc_en/enc_dis, and at this time, the channel (e.g. the third channel 230) corresponding to the green component of the image frame can be always disabled to lower the power consumption. It should be noted that the first channel 210, the second channel 220, and the third channel 230 correspond to red, green and blue channels are merely examples, and the present invention is not limited thereto. In other embodiments, the first channel 210, the second channel 220 and the third channel 230 may correspond to other kinds of color information, such as YUV channels or YCbCr channels, and the first control bit CTL2 and the second control bit CTL3 may be included in the Y channel or other channels, the third control bit CTL0 and the fourth control bit CTL1 may be included in another channel.

Figure 5:
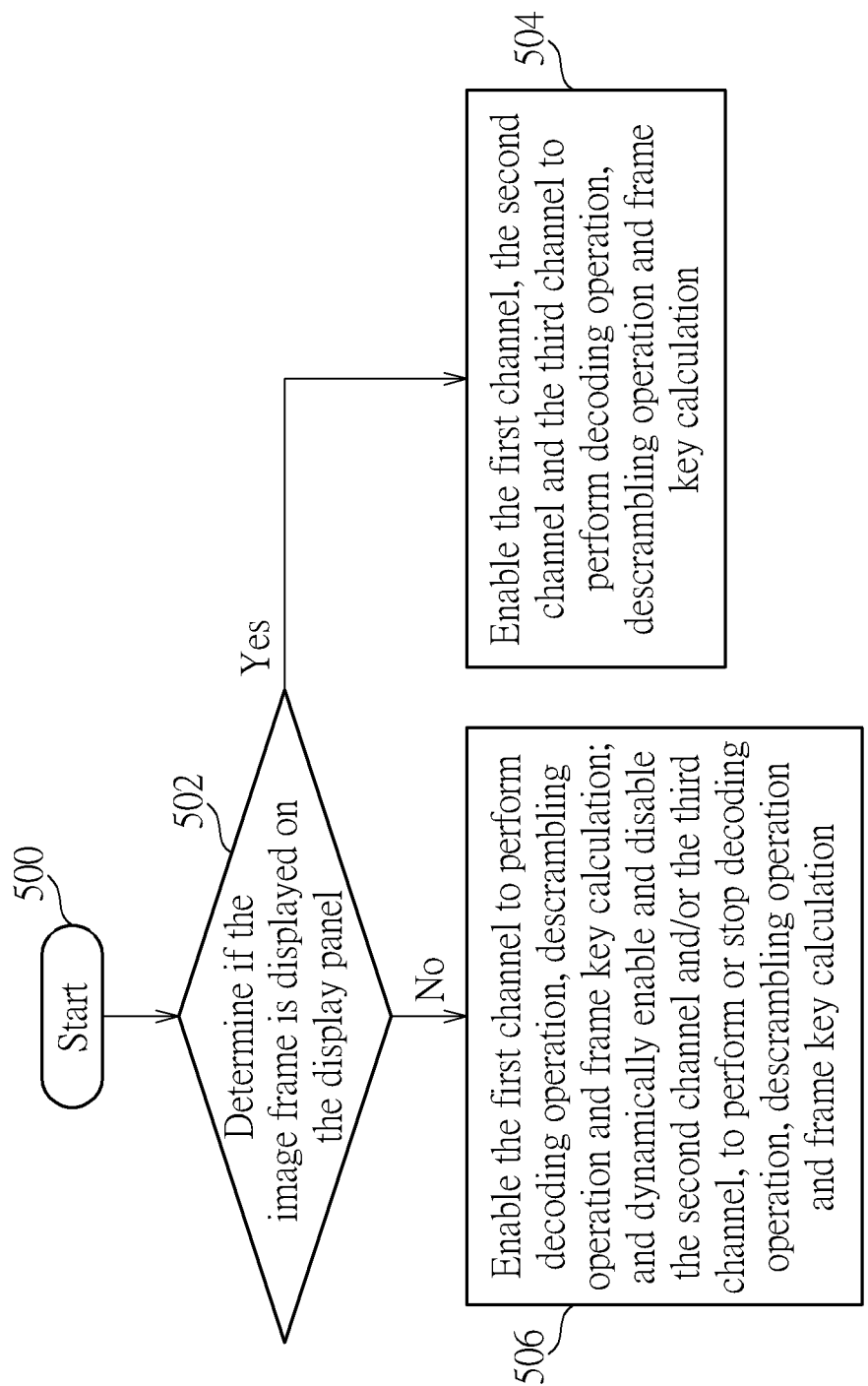
FIG. 5 is a flowchart of a signal processing method applied to HDMI according to one embodiment of the present invention.

FIG. 5 is a flowchart of a signal processing method applied to HDMI according to one embodiment of the present invention. Referring to the above embodiments, the flow is described as follows:

Step 500: the flow starts.

Step 502: determine if the image frame is displayed on the display panel, and if yes, the flow enters Step 504; and if not, the flow enters Step 506.

Step 504: enable the first channel, the second channel and the third channel to perform decoding operation, descrambling operation and frame key calculation.

Step 506: enable the first channel to perform decoding operation, descrambling operation and frame key calculation; and dynamically enable and disable the second channel and/or the third channel, to perform or stop decoding operation, descrambling operation and frame key calculation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiving circuit applied to a High Definition Multimedia Interface (HDMI), comprising:
a first channel, for decoding and descrambling a first data stream to generate first data corresponding to first color information of an image frame;
a second channel, for decoding and descrambling a second data stream to generate second data corresponding to second color information of the image frame;
a third channel, for decoding and descrambling a third data stream to generate third data corresponding to third color information of the image frame; and
a control circuit, for enabling the first channel to make the first channel decode the first data stream, and enabling or disabling at least part of functions of the second channel and the third channel according to whether or not the image frame is displayed on a display panel.

2. The receiving circuit of claim 1, wherein when the image frame is not displayed on the display panel, the control circuit continuously enables the first channel to make the first channel decode the first data stream to obtain descramble align information, and use the descramble align information to perform a descrambling operation to generate the first data; and the control circuit dynamically enables and disables the second channel and/or the third channel according to timing of the image frame.

3. The receiving circuit of claim 2, further comprising:
a channel offset calculating circuit, for calculating channel offset information between the first channel, the second channel and the third channel;
wherein when the control circuit dynamically enables and disables the second channel and/or the third channel according to the timing of the image frame, the second channel and/or the third channel refer to the descramble align information and the channel offset information to perform the descrambling operation to generate the second data and/or the third data.

4. The receiving circuit of claim 2, further comprising:
a timer;
wherein the control circuit refers to time information provided by the timer to determine a time point of a vertical synchronization signal, and enables or disables the second channel and/or the third channel according to the time point of the vertical synchronization signal.

5. The receiving circuit of claim 4, wherein the control circuit refers to the time information provided by the timer to enable the second channel and/or the third channel before the vertical synchronization signal appears; and the control circuit disables the second channel and/or the third channel for a period of time after the vertical synchronization signal appears.

6. The receiving circuit of claim 5, wherein the control circuit refers to the time information provided by the timer to enable the second channel and/or the third channel before the vertical synchronization signal appears to determine an encryption status signal; and the first channel calculates a frame key according to the first data and the encryption status signal.

7. The receiving circuit of claim 1, wherein when the image frame is not displayed on the display panel, the control circuit continuously enables the first channel to make the first channel decode the first data stream to obtain descramble align information, and use the descramble align information to perform a descrambling operation to generate the first data; and the control circuit disables the second channel and/or the third channel.

8. The receiving circuit of claim 7, wherein the first channel directly obtains an encryption status signal from the first data, and calculates a frame key according to the first data and the encryption status signal.

9. The receiving circuit of claim 7, wherein the receiving circuit conforms to a specification of HDMI 2.0, and the first channel corresponds to a red component of the image frame.

10. The receiving circuit of claim 1, wherein the first data stream comprises a first control bit and a second control bit, and the first channel determines an encryption status signal according to the first control bit and the second control bit.

11. A signal processing method applied to High Definition Multimedia Interface (HDMI), comprising:
providing a first channel to decode and descramble a first data stream to generate first data corresponding to first color information of an image frame;
providing a second channel to decode and descramble a second data stream to generate second data corresponding to second color information of the image frame;
providing a third channel to decode and descramble a third data stream to generate third data corresponding to third color information of the image frame; and
enabling the first channel to make the first channel decode the first data stream, and determining to enable or disable at least part of functions of the second channel and the third channel according to whether or not the image frame is displayed on a display panel.

12. The signal processing method of claim 11, wherein the step of determining to enable or disable the at least part of functions of the first channel, the second channel and the third channel according to whether or not the image frame is displayed on the display panel comprises:
  when the image frame is not displayed on the display panel:
  continuously enabling the first channel to make the first channel decode the first data stream to obtain descramble align information, and use the descramble align information to perform a descrambling operation to generate the first data; and
  dynamically enabling and disabling the second channel and/or the third channel according to timing of the image frame.

13. The signal processing method of claim 12, further comprising:
  calculating channel offset information between the first channel, the second channel and the third channel; and
  the second channel and/or the third channel refer to the descramble align information and the channel offset information to perform the descrambling operation to generate the second data and/or the third data.

14. The signal processing method of claim 12, further comprising:
  referring to time information provided by a timer to determine a time point of a vertical synchronization signal; and
  enabling or disabling the second channel and/or the third channel according to the time point of the vertical synchronization signal.

15. The signal processing method of claim 14, wherein the step of enabling or disabling the second channel and/or the third channel according to the time point of the vertical synchronization signal comprises:
  referring to the time information provided by the timer to enable the second channel and/or the third channel before the vertical synchronization signal appears; and
  disabling the second channel and/or the third channel for a period of time after the vertical synchronization signal appears.

16. The signal processing method of claim 15, further comprising:
  referring to the time information provided by the timer to enable the second channel and/or the third channel before the vertical synchronization signal appears to determine an encryption status signal; and
  the first channel calculates a frame key according to the first data and the encryption status signal.

17. The signal processing method of claim 11, wherein the step of determining to enable or disable the at least part of functions of the first channel, the second channel and the third channel according to whether or not the image frame is displayed on the display panel comprises:
  when the image frame is not displayed on the display panel:
  continuously enabling the first channel to make the first channel decode the first data stream to obtain descramble align information, and use the descramble align information to perform a descrambling operation to generate the first data; and
  disabling the second channel and/or the third channel.

18. The signal processing method of claim 17, further comprising:
  the first channel directly obtains an encryption status signal from the first data, and calculates a frame key according to the first data and the encryption status signal.

19. The signal processing method of claim 17, wherein the signal processing method conforms to a specification of HDMI 2.0, and the first channel corresponds to a red component of the image frame.

20. The signal processing method of claim 11, wherein the first data stream comprises a first control bit and a second control bit, and the signal processing method further comprises:
  the first channel determines an encryption status signal according to the first control bit and the second control bit.

* * * * *